United States Patent [19]
Kawakami

[11] Patent Number: 5,972,531
[45] Date of Patent: Oct. 26, 1999

[54] PROCESS AND APPARATUS FOR RECOVERING CONSTITUENT COMPONENTS OF BATTERY

[75] Inventor: Soichiro Kawakami, Nara, Japan

[73] Assignee: Canon Kabushiki Kaisha, Tokyo, Japan

[21] Appl. No.: 08/995,900

[22] Filed: Dec. 22, 1997

[30] Foreign Application Priority Data

Dec. 24, 1996 [JP] Japan .................................. 8-355439

[51] Int. Cl.$^6$ .......................... H01M 6/52; H01M 10/54
[52] U.S. Cl. ................................................................ 429/49
[58] Field of Search ..................................... 429/49

[56] References Cited

U.S. PATENT DOCUMENTS 5,252,189  10/1993  Celi .......................................... 204/104
5,491,037   2/1996  Kawakami ................................ 429/49
5,582,931  12/1996  Kawakami ............................... 429/127
5,693,105  12/1997  Kawakami .............................. 29/623.2
5,888,463   5/1999  McLaughlin et al. ............... 423/179.5

OTHER PUBLICATIONS

Derwent Abstract of WO 9425167 A; Kamphuis, B. (inventor); Leto Recycling (assigne), Nov. 10, 1994.

Primary Examiner—Maria Nuzzolillo
Assistant Examiner—Jennifer O'Malley
Attorney, Agent, or Firm—Fitzpatrick, Cella, Harper & Scinto

[57] ABSTRACT

A recovering process for recovering constituent components of a battery having at least an active material layer formed on a collector, said process includes at least a step of separating said active material layer from said collector by applying thermal shock to the electrode by way of at least cooling the electrode.

15 Claims, 7 Drawing Sheets

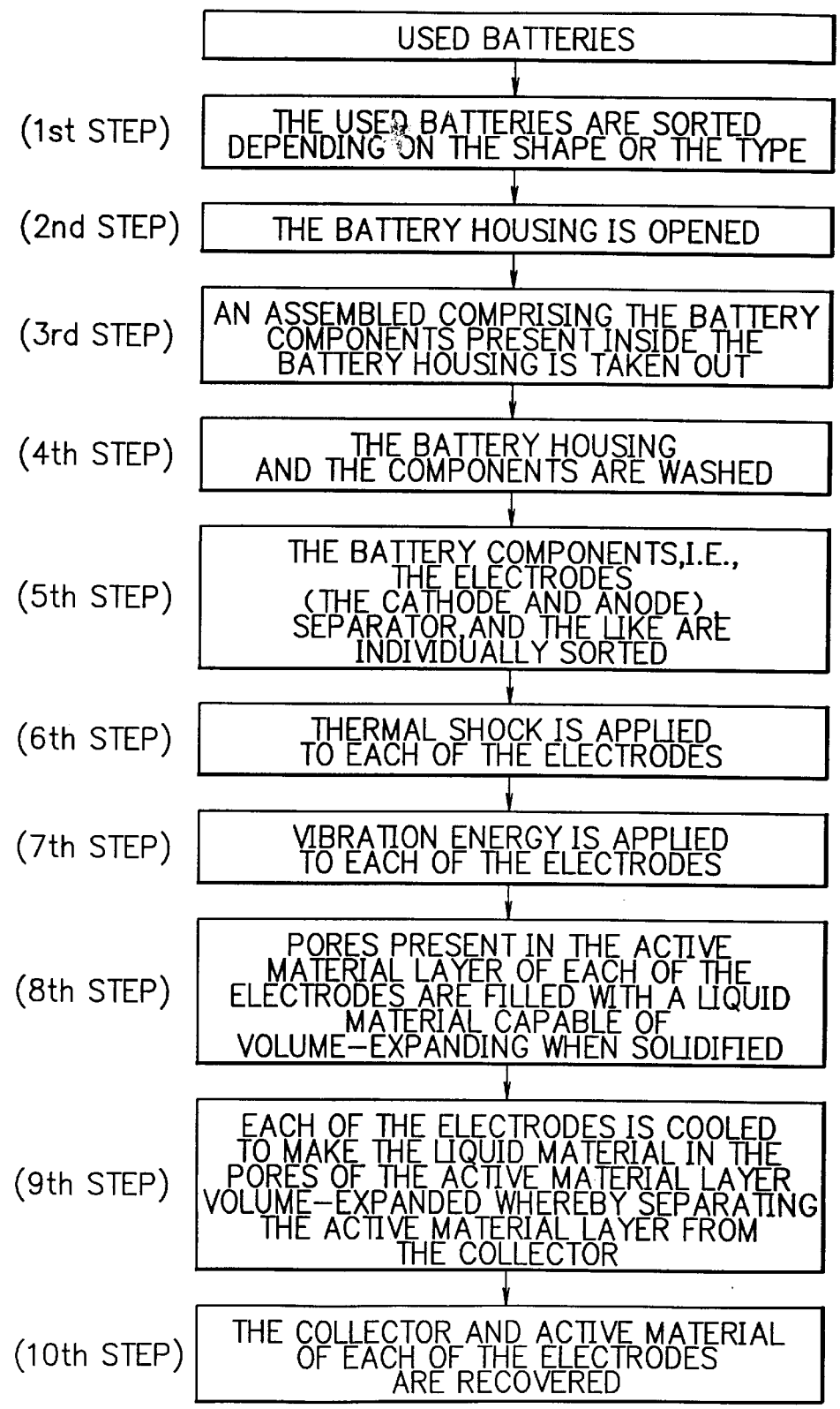

F I G. 5
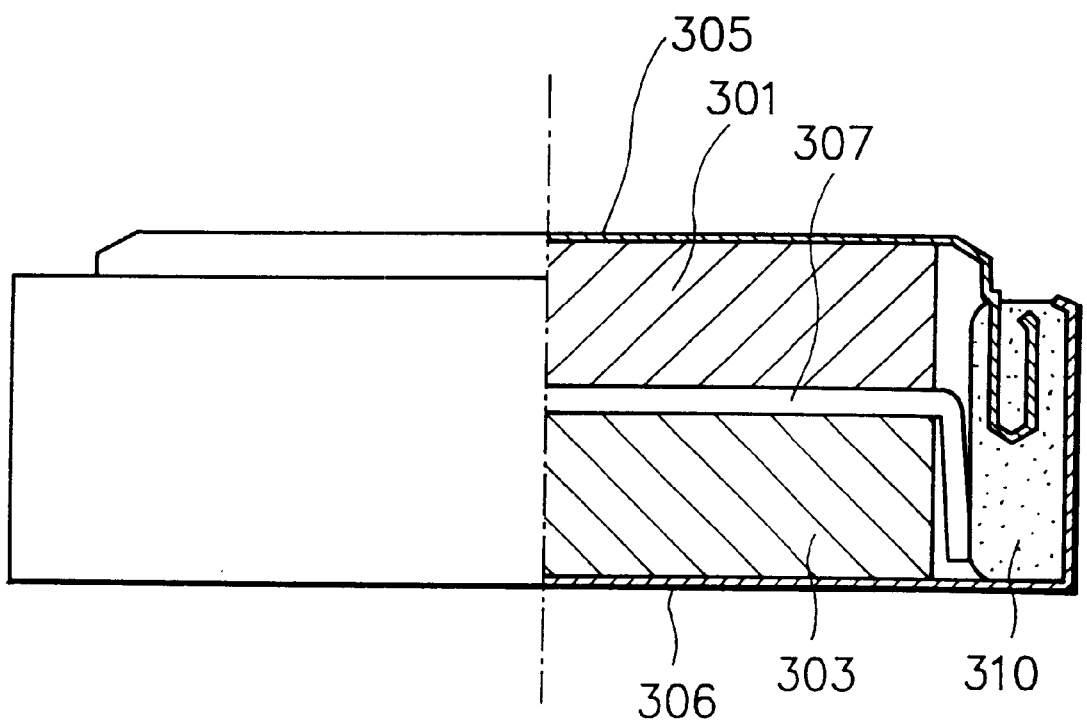

PROCESS AND APPARATUS FOR RECOVERING CONSTITUENT COMPONENTS OF BATTERY

BACKGROUND OF THE INVENTION

1. Field of the Invention

The present invention relates to a process and apparatus for recovering the constituent components of a battery. More particularly, the present invention relates to a process and apparatus which enable to efficiently dissociate constituent components of a battery one from the other and efficiently recover these components.

2. Related Background Art

In recent years, global warming from the so-called greenhouse effect has been predicted due to increased level of atmospheric $CO_2$. To prevent this warming phenomenon from further developing, there is a tendency to prohibit the construction of new thermal power plants which convert thermal energy obtained by burning fossil fuel or the like into electric energy, where a large quantity of $CO_2$ is exhausted.

Under these circumstances, proposals have been made to institute load leveling in order to effectively utilize power. Load leveling involves the installation of rechargeable batteries at general locations to serve a storage for surplus power unused in the night, known as dump power. The power thus stored is available in the day time when the power demand is increased, leveling the load requirements in terms of power generation.

Separately, there is an increased societal demand for developing a high performance rechargeable battery with a high energy density for an electric vehicle which would not exhaust air polluting substances such as COx, NOx, CH, and the like. There is a further increased societal demand for developing a miniature, lightweight, high performance rechargeable battery usable as a power source for potable instruments such as small personal computers, word processors, video cameras, and pocket telephones.

For the batteries including rechargeable batteries for such uses as above mentioned, there have been developed so-called nickel-metal hydride batteries and rechargeable lithium ion batteries.

Such nickel-metal hydride battery is a rechargeable battery in which a hydrogen storage (absorbing) alloy capable of storing hydrogen ion therein is used as the anode active material of the anode and the performance of the hydrogen ion to get in and out the anode active material is utilized. In the case where a misch metal is used as the hydrogen storage alloy of the anode active material, the anode is usually formed by fixing a powdery misch metal onto an anode collector with the use of a resin binder. The cathode is usually formed by filling a porous nickel material with nickel hydroxide (specifically, nickelous hydroxide).

As a typical example of such rechargeable lithium ion battery, there is known a rocking chair type lithium ion battery in which a carbonous material such as graphite is used as the anode active material, an intercalation compound intercalated with lithium ion is used as the cathode active material, and the lithium ion is intercalated into the six-membered network planes provided by carbon atoms to store in the battery reaction upon charging. The anode of the lithium ion battery is usually formed by fixing the carbonous material onto an anode collector comprising a given metal foil with the use of a resin binder. The cathode of the lithium ion battery is usually formed by fixing a mixture composed of an oxide of a transition metal compound in powdery form as the cathode active material and an electrically conductive auxiliary comprising an amorphous carbon material onto a cathode collector comprising a given metal foil with the use of a resin binder.

Incidentally, these batteries have been currently using particularly in various potable instruments, and it is considered that the consumption of them will be further increased as new potable instruments are developed. Therefore, for used batteries, a societal demand for recovering them and recycling their components will be more increased in the future not only in terms of environmental protection but also in viewpoints that new rechargeable batteries are expected to be developed in the future so that they can be used in electric vehicles, load conditioners, power storage, or the like.

However, for the nickel-metal hydride batteries and rechargeable lithium ion batteries, particularly in order for them to have a stable performance, the respective electrodes (the anode and cathode) are formed by firmly fixing the anode or cathode active material to the corresponding collector, and because of this, to recover these active materials by separating from the collectors can not be easily conducted. In view of this, there will be an increased demand for providing a method which enables to efficiently separate the active materials from the collectors whereby desirably recover them.

SUMMARY OF THE INVENTION

The present invention makes it an object to provide a process and apparatus which enable to efficiently recovering the constituent components of a battery having electrodes comprising an active material layer formed on a collector while separating the active materials from the collectors.

Another object of the present invention is to provide a recovering process for recovering the constituent components of a battery having at least opposite electrode components comprising an active material layer formed on a collector, the electrode components being assembled in a battery housing while being sealed therein, said process including the steps of opening the battery housing of the battery, taking out at least the electrode components from the battery housing, sorting the electrode components into individuals, and applying thermal shock to each of the electrode components thus sorted at least by way of cooling or preferably by way of rapid cooling, whereby separating the active material layer from the collector for each of the two electrode components.

A further object of the present invention is to provide a recovering apparatus for recovering the constituent components of a battery comprising at least opposite electrode components comprising an active material layer formed on a collector, the electrode components being assembled in a battery housing while being sealed therein, said recovering apparatus comprising at least means for opening the battery housing of the battery, means for taking out the electrode components from the battery housing and washing them, means for sorting the electrode components into individuals, and means for applying thermal shock to each of the two electrode components at least by way of cooling or preferably by way of rapid cooling, wherein the active material layer is separated from the collector for each of the electrode components.

BRIEF DESCRIPTION OF THE DRAWINGS

FIG. 1 is a schematic flow diagram illustrating an example of a principal part of a recovering process for recovering the components of a battery according to the present invention.

FIG. 5 is a schematic cross-sectional view illustrating an example of a coin-like shaped battery.

DESCRIPTION OF THE INVENTION AND PREFERRED EMBODIMENTS

Figure 2A:
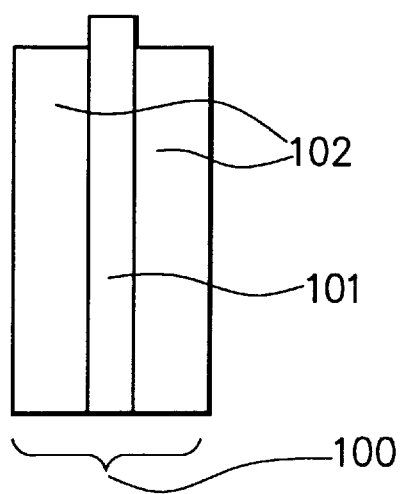
FIGS. 2(a) through 2(c) are schematic cross-sectional conceptual views illustrating an embodiment of a recovering process for recovering the components of a battery in the present invention in which for an electrode (an anode or cathode) comprising an active material layer formed on a collector, said electrode is incorporated with a liquid material (having a property of causing volume expansion when solidified) so as to fill pores present in said electrode, and the liquid material contained in the pores of the electrode is subjected to volume expansion whereby separating the active material layer from the collector.

As previously described, the present invention provides a recovering process for recovering the constituent components of a battery comprising at least opposite electrode components (an anode component and a cathode component) each comprising an active material layer formed on a collector, the electrode components being assembled in a battery housing while being sealed therein, said process including the steps of opening the battery housing of the battery, taking out at least the electrode components from the battery housing, sorting the electrode components into individuals, and applying thermal shock to each of the electrode components thus sorted by way of cooling, or preferably by way of rapid cooling, whereby separating the active material layer from the collector for each of the electrode components.

According to the recovering process of the present invention, for each electrode component, the active material of the active material layer can be readily separated from the collector without deteriorating the active material, where the active materials of the active material layers and the collectors of the electrode components can be effectively and desirably recovered. These components thus recovered can be effectively recycled for the production of a battery.

In the recovering process according to the present invention, it is possible to apply an impact energy or a vibration energy in addition to the thermal energy upon separating and removing the active material layer from the collector. In this case, the separation of the active material layer from the collector is facilitated.

The thermal shock by way of cooling in the present invention is meant so-called shrinkage-expanding treatment for a material by way of cooling (preferably, by way of rapid cooling) only or by way of a combination of cooling (preferably, rapid cooling) and heating. It is possible for the cooling (or the rapid cooling) to be conducted once or to be repeated several times. Similarly, the heating may be also conducted once or repeated several times.

Further in the recovering process according to the present invention, it is preferred that the pores present in the electrode component comprising at least the active material layer formed on the collector are filled with a liquid material having a property of causing volume expansion when solidified, followed by subjecting to cooling or preferably, rapid cooling, where the liquid material contained in the pores of the electrode component is solidified to expand and as a result, the active material layer is broken due to the expansion of the liquid material. By this, the active material of the active material layer can be readily peeled and separated from the collector. In this case, the cooling (the rapid cooling) is desired to be conducted such that the liquid material contained in the pores present in the electrode component is cooled to a temperature below the solidifying temperature of the liquid material. In the case where the liquid material contained in the pores of the electrode component is quickly cooled to a temperature below the solidifying temperature of the liquid material, the peeling and separation of the active material layer from the collector are further facilitated.

It is possible for the liquid material to contain a surface active agent. In this case, the wettability of the liquid material with the active material layer is improved so that the liquid material desirably invades into the innermost of each of the pores present in the active material layer and as a result, the pores present in the electrode component are sufficiently filled with the liquid material.

As above described, the recovering process according to the present invention is directed to peeling and separating an active material layer (formed on a collector) from the collector. Hence, the recovering process according to the present invention is effective in recovering the constituent components of a battery although it is either a primary battery or a secondary (rechargeable) battery, as long as it has a structure having an active material layer formed on a collector.

As previously described, the present invention includes a recovering apparatus for recovering the constituent components of a battery comprising at least opposite electrode components (an anode component and a cathode component) each comprising an active material layer formed on a collector, the electrode components being assembled in a battery housing while being sealed therein, said recovering apparatus comprising at least means for opening the battery housing of the battery, means for taking out the electrode components from the battery housing and washing them, means for sorting the electrode components into individuals, and means for applying thermal shock to each of the two electrode components at least by way of cooling (preferably, by way of rapid cooling), wherein the active material layer is sufficiently and effectively separated from the collector for each of the electrode components.

The recovering apparatus according to the present invention enables to readily separate the active material of the active material layer from the collector for each electrode component without deteriorating the active material, where the active materials of the active material layers and the collectors of the two electrode components can be effectively and desirably recovered. These components thus recovered can be effectively recycled for the production of a battery.

In the recovering apparatus according to the present invention, the means for applying thermal shock to the electrode component may be accompanied with means capable of at least quickly heating the electrode component. In this case, the magnitude of the thermal shock applied to the electrode component can be desirably increased, where the separation of the anode active material layer from the cathode can be facilitated.

The recovering apparatus according to the present invention may be provided with means for filling a liquid material (having a property of causing volume expansion when solidified) in the pores present in each of the electrode components (each comprising the active material layer formed on the collector) after these electrode components have been sorted into individuals and means for rapidly cooling each of the electrode components incorporated with the liquid material to a temperature below the solidifying temperature of the liquid material. In this case, the separation of the active material layer from the collector for each electrode component can be further facilitated.

The means for filling the pores present in the electrode component with the liquid material may comprises at least a vessel for accommodating the electrode component and the liquid material therein and an exhaustion means for reducing the inside pressure of the vessel. In this case, the liquid material can be invaded into the innermosts of the pores present in the active material layer of the electrode component such that the pores are sufficiently filled with the liquid material. By this, the separation of the active material of the active material layer from the collector by solidifying the liquid material is extremely facilitated.

The vessel for accommodating the electrode component and the liquid material therein may be provided with means for supplying the liquid material into the vessel from a reservoir containing the liquid material therein and returning the liquid material from the vessel to the reservoir. In this case, the liquid material can be recycled.

In the following, the present invention will be described in more detail with reference to the drawings.

Figure 4:
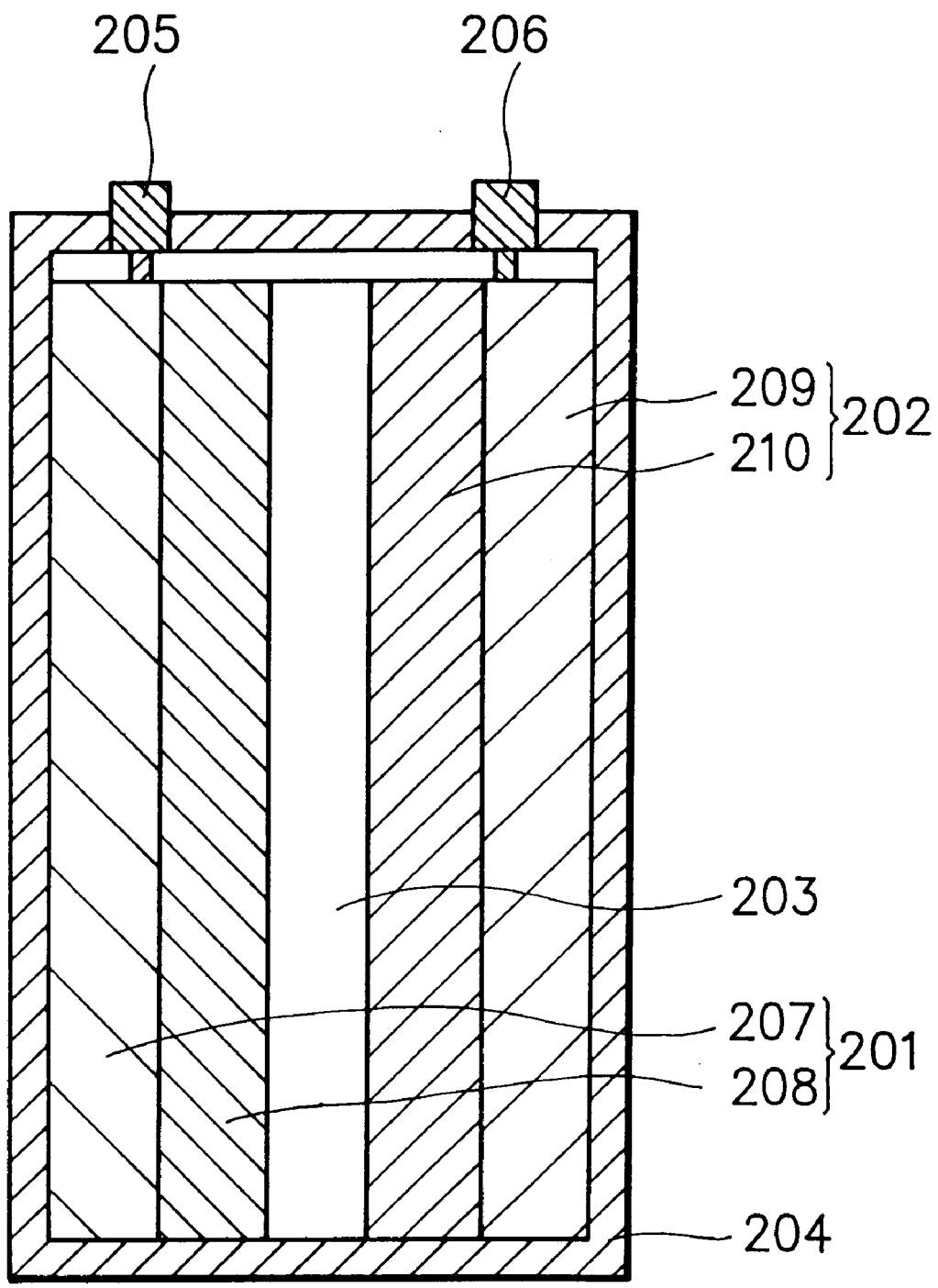
FIG. 4 is a schematic cross-sectional view illustrating a basic constitution of an example of a battery whose components are recovered in the present invention.

FIG. 4 is a schematic cross-sectional view illustrating a basic constitution of an example of a battery whose constituent components are recovered in the present invention.

In the battery shown in FIG. 4, an assembled body comprising a separator 203 (including an electrolyte) interposed between an anode 201 which comprises an anode active material layer 208 formed on an anode collector 207 and a cathode 202 which comprises a cathode active material layer 210 formed on a cathode collector 209 is enclosed by a battery housing 204 (or a battery vessel).

In the case where a solid electrolyte is used as the electrolyte, no separator is occasionally installed.

Reference numeral 205 indicates a negative terminal (a negative outputting and inputting terminal) which is provided at the capping of the battery housing while electrically connecting to the anode collector 207 through a lead, and reference numeral 206 indicates a positive terminal (a positive outputting and inputting terminal) which is provided at the capping of the battery housing while electrically connecting to the cathode collector 209 through a lead.

The term "active material" in the present invention means a material which is involved in the repetition of electrochemical reversible reaction of charging and discharging in a battery. The active material can include, in addition to said material which is involved in the above reaction by itself, other materials capable of being involved in the above reaction.

For the configuration of the battery whose constituent components are recovered in the present invention, it may be in the form of a flat round shape (or a coin-like shape), a cylindrical shape, a prismatic shape, or a sheet-like shape. For the battery structure, it includes a single-layered type, a multi-layered type and a spiral-wound type.

FIG. 1 is a schematic flow diagram illustrating an example of a principal part of a recovering process for recovering the components of a battery according to the present invention.

In the following, the recovering process according to the present invention in the case of recovering the constituent components of a battery having such configuration as shown in FIG. 4 will be explained in accordance with the flow diagram shown in FIG. 1.

In the first step, used batteries (having such configuration as shown in FIG. 4) whose constituent components are to be recovered are sorted depending on the shape or the type in order to efficiently conduct their decomposition and recovery.

In the second step, for one of the batteries sorted in the first step, the battery housing 204 is opened.

In the third step, an assembled body comprising the anode 201, the cathode 202 and the separator 203 is taken out from the battery housing 204.

In the fourth step, the assembled body taken out from the battery housing 204 in the third step is washed using a solvent to remove absorbed materials including an electrolyte solution, which are present on or in the assembled body. The electrolyte solution contained in the solvent used herein for washing the assembled body is independently recovered in a separate step.

In the fifth step, the assembled body is dissociated and sorted into individual components (an electrode component comprising the anode 201, an electrode component comprising the cathode 202, a component comprising the separator 203, and the like).

In the sixth step, the electrode component comprising the anode 201 and the electrode component comprising the cathode 202 sorted in the fifth step are separately subjected to cooling or preferably, rapid cooling, if necessary, while rapidly heating these electrode components, where the collectors (207, 209) and the active material layers (208, 210) of the electrode components are suffered from thermal shock and as a result, peeling is occurred at the interface between the active material layer and the collector in each electrode component to separate the active material layer from the collector.

In this case, if necessary, it is possible to apply an impact energy or vibration energy to these electrode components in order to facilitate the separation of their active material layers from their collectors (the seventh step)

In the sixth or seventh step or optionally, without conducting the sixth and seventh steps after the fifth step, the pores present in the active material layer of each electrode component are filled with a liquid material having a property of causing volume expansion when solidified [the eighth step], followed by rapidly cooling each electrode, preferably, to a temperature below the solidifying temperature of the liquid material, whereby causing volume expansion for the liquid material, where the separation of the active material layer from the collector in each electrode component is sufficiently conducted [the ninth step]. In this case, if necessary, it is possible to apply an impact energy or vibration energy to each of the electrode components.

Then, the active material layers (208, 210) are sufficiently separated from the collectors (207, 209) and they are recovered [the tenth step].

For the active material layers (208, 210) which have been separated from the collectors (207, 209), it is possible that each of these active material layers is cooled to a temperature which is lower than the glass transition temperature of the binder contained therein, followed by pulverizing into a powdery active material.

Figure 2B:
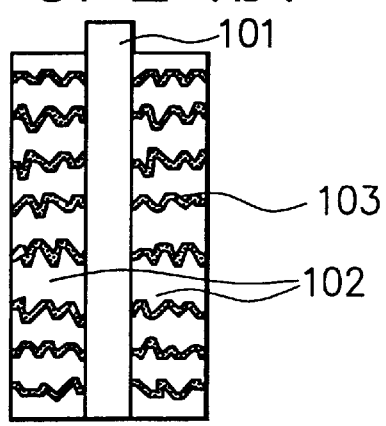
Figure 2C:
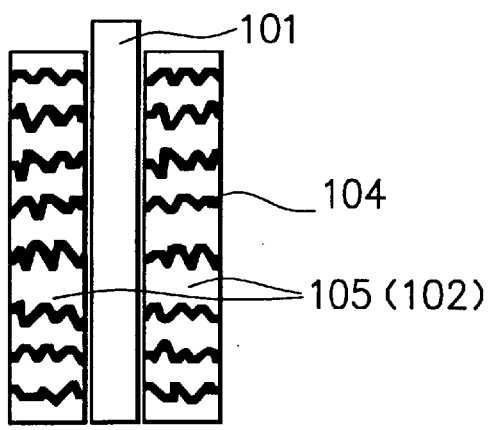

The situations in the above recovering process are schematically shown in FIGS. 2(*a*) through 2(*c*). Particularly, FIGS. 2(*a*) through 2(*c*) are schematic cross-sectional conceptual views illustrating embodiments when the liquid material contained in the pores of one of the electrode components is subjected to volume expansion whereby separating the active material layer from the collector. In more detail, FIGS. 2(*a*) through 2(*c*) are explaining transitions in the state of a given electrode (the anode or cathode) in the recovering process (specifically in the above eighth to ninth steps) when for the electrode (the anode or cathode) comprising the active material layer formed on the collector, the electrode is incorporated with the liquid material (having a property of causing volume expansion when solidified) so as to fill the pores present in the electrode, and the liquid material contained in the pores of the electrode is subjected to volume expansion whereby separating the active material layer from the collector.

FIG. 2(*a*) is a schematic cross-sectional view illustrating an electrode 100 (an anode or cathode) comprising an active material layer 102 formed on a collector 101.

FIG. 2(*b*) a schematic cross-sectional view illustrating an embodiment of the electrode when the pores present in the active material layer 102 are filled with the foregoing liquid material 103 (having a property of causing volume expansion when solidified).

FIG. 2(*c*) a schematic cross-sectional view illustrating an embodiment of the electrode when the liquid material contained in the pores present in the active material layer is volume-expanded by rapidly cooling the liquid material to a temperature below the solidifying temperature of the liquid material to solidify the liquid material. In FIG. 2(*c*), reference numeral 104 indicates the volume-expanded liquid material, and reference numeral 105 indicates an active material of the active material layer which has been separated from the collector.

Figure 3:
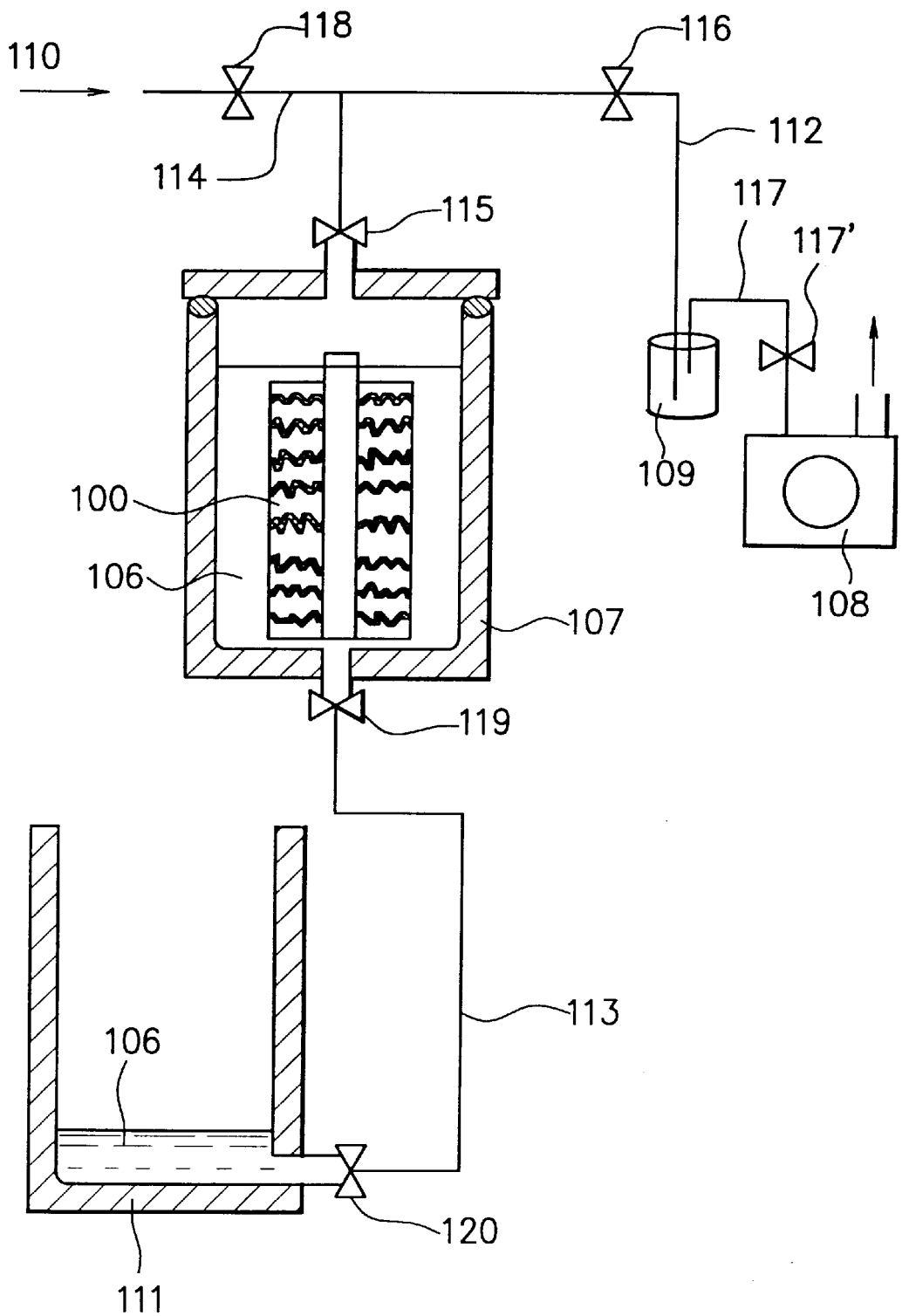
FIG. 3 is a schematic diagram illustrating the constitution of an example of an apparatus for filling a liquid material (having a property of causing volume expansion when solidified) in pores present in an electrode comprising an active material layer formed a collector, said apparatus being a part of a recovering apparatus for recovering the components of a battery in the present invention.

FIG. 3 is a schematic diagram illustrating the constitution of an example of an apparatus for filling the liquid material (having a property of causing volume expansion when solidified) in the pores present in the active material layer of the electrode component (in the foregoing eighth and ninth steps), said apparatus being a part of the recovering apparatus for recovering the components of a battery in the present invention.

The apparatus shown in FIG. 3 comprises an accommodation vessel 107 for accommodating an electrode component 100 therein; an exhaustion means 108 comprising a vacuum pump or the like for reducing the inside pressure of the accommodation vessel 107 by evacuating the inside of the accommodation vessel; a liquid reservoir 111 for storing a liquid material 106 (having a property of causing volume expansion when solidified) therein; a cooling trap 109 for preventing the liquid material from arriving in the exhaustion means 108 when the inside of the accommodation vessel is evacuated by the exhaustion means 108; an exhaust pipe 112 provided with an exhaust valve 116 and through which the inside of the accommodation vessel 107 being communicated with the inside of the cooling trap 109; an exhaust pipe 117 provided with an exhaust valve 117' and which is extending from the exhaustion means 108 and communicated with the inside of the cooling trap 109, a liquid transporting pipe 113 extending from the liquid reservoir 111 through a liquid transporting valve 120 and which is communicated with the inside of the accommodation vessel 107 through a liquid transporting valve 119; and a gas transporting pipe 114 for supplying a compressed gas 110 from a compressed gas supply source (not shown) into the accommodation vessel 107.

Reference numeral 115 indicates a vessel valve provided at the accommodation vessel 107 and through which the exhaust pipe 116 is communicated with the inside of the accommodation vessel 107. Reference numeral 118 indicates a gas transporting valve which is provided at the gas transporting pipe 114. The gas transporting pipe 114 is communicated with the exhaust pipe 112.

In the following, description will be made on the basis of FIG. 3. Particularly, for the electrode component which has been taken out from the housing by opening the battery housing and washed with the solvent (in the foregoing second to fourth steps), to fill the pores present in the electrode component with the liquid material (having a property of causing volume expansion when solidified) using the apparatus shown in FIG. 3 may be conducted, for instance, as will be described below.

The electrode component (100) is positioned in the accommodation vessel 107. By actuating the vacuum pump of the exhaustion means 108 and opening the exhaust valves 116 and 117' and the vessel valve 115 while closing the liquid transporting valves 119 and 120 and the gas inducing valve 118, the inside of the accommodation vessel 107 is evacuated through the exhaust pipes 117 and 112 to a predetermined vacuum. After this, the exhaust valves 116 and 117' and the vessel valve 115 are closed. Then, by opening the liquid transporting valves 119 and 120, the liquid material 106 from the liquid reservoir 111 is introduced into the accommodation vessel 107 through the liquid transporting pipe 113, where the liquid material 106 introduced into the accommodation vessel 107 invades into the pores present in the electrode component 100 such that the pores are sufficiently filled with the liquid material 106. Successively, by opening the gas inducing valve 118 and the vessel valve 115, the compressed gas 110 from the compressed gas supply source (not shown) is introduced into the accommodation vessel 107 through the gas transporting pipe 114, where the liquid material 106 remained in the accommodation vessel is returned into the liquid reservoir 111. Thereafter, the gas inducing valve 118 and the vessel valve 115 are closed. Then, the electrode component 100 whose pores being filled with the liquid material is taken out from the apparatus.

The electrode component thus treated is rapidly cooled to a temperature below the solidifying temperature of the liquid material, where the liquid material contained in the pores of the electrode component 100 is solidified to cause volume expansion, whereby the active material layer is separated from the collector.

In the following, description in more detail will be made of the principal steps in the above-described recovering process of the present invention for recovering the constituent components of a battery.

Opening of Battery Housing

The Foregoing Second Step; See FIG. 1

To open the battery housing may conducted an appropriate opening manner by way of cutting with the use of a high pressure water or an energy beam or by a conventional mechanically cutting manner.

The cutting with the use of a high pressure water may be conducted, for example, by a manner of spraying an extra-high pressure water of preferably 1000 Kg/cm$^2$ or more or more preferably, 3000 Kg/cm$^2$ or more onto the battery housing of a battery in a jet-like state through a nozzle. In this case, the extra-high pressure water to be sprayed may contain an appropriate abrasive depending upon the kind of the constituent of the battery housing.

The above energy beam can include laser beam, electron beam and the like.

The above mechanically cutting manner may be conducted by using a cutting apparatus of cutting an object by rotating a disc-like shaped blade (having a hard and sharp edge) at a high speed or by way of shearing.

Washing of Battery Components

The Foregoing Fourth Step; See FIG. 1

As previously described, after the battery housing is opened, the battery components are taken out from the battery housing, and they are washed with an appropriate solvent. The battery components thus washed are sorted into individuals, followed by subjecting to a recovery step where they are recovered. In this washing step, the electrolyte solution can be recovered. In addition, the electrolyte solution absorbed on or in the battery components including the electrode components (the anode and cathode), the separator, the battery housing, and the like can be removed. This situation enables to readily conduct the recovery of each of the battery components, which will be later conducted.

As the above washing solvent, it is desired to use water in the case where the electrolyte solution comprises an aqueous electrolyte solution. In the case where the electrolyte solution comprises a non-aqueous electrolyte solution, it is desired to use an organic solvent. Specific examples of such organic solvent are methanol, acetone, 1,2-propanediol, dimethyl sulfoxide, butyrolactone, and propylene carbonate.

Sorting of Electrodes

The Foregoing Fifth Step; See FIG. 1

The sorting of the anode and the cathode into individuals can be readily conducted by a conventional sorting manner. For instance, in the case of a battery having an electrode structure in which a ferromagnetic material is used only in one of the anode and cathode, by drawing the electrode containing the ferromagnetic material using an electromagnet upon recovering the battery components, where the anode and cathode can be readily sorted into individuals.

Application of Thermal Shock

The Foregoing Sixth Step; See FIG. 1

Upon applying the thermal shock to the electrode component, the temperature difference before and after the processing in the cooling and heating is desired to be preferably 100° C. or more or more preferably, 200° C. or more.

For the heating temperature in order to apply the thermal shock to the electrode component, it is necessary to be less than a temperature at which the binder or the like contained in the electrode component is deteriorated. And for the heating rate (that is, the temperature rise rate), it is desired to be more than 20° C./minute.

For the cooling rate (that is, the temperature reduction rate) upon applying the thermal shock, it is desired to be preferably more than 5° C./second or more preferably, more than 10° C./second.

In the case of an electrode component (an anode or cathode) in which the active material is bonded onto the collector with the use of a binder, it is desired to quickly cool the electrode component to a lower temperature than the glass transition temperature of the binder.

In the case where after the pores present in the active material layer of the electrode component are filled with the liquid material (having a property of causing volume expansion when solidified), the electrode component is quickly cooled to a temperature below the solidifying temperature of the liquid material whereby separating the active material layer from the collector, followed by recovering the active material of the active material layer and the collector, the cooling temperature is made to be a temperature which is lower than the solidifying temperature of the liquid material. Specifically, the cooling temperature is preferably 0° C. or less or more preferably, −20° C. or less.

To cool the electrode component may be conducted by way of rapid cooling with the use of a compressed incombustible gas or by way of rapid cooling with the use of a liquefied gas or a cooling agent.

The liquefied gas can include liquid nitrogen, liquid helium, and the like. In the case of using such liquefied gas, there can be employed a cooling manner wherein the electrode component is directly immersed in the liquefied gas to rapidly cool the electrode component, or a cooling manner wherein a low temperature gas resulted from the liquefied gas is sprayed onto the electrode component to quickly cool the electrode component.

The above cooling agent can include dry ice-methanol, dry ice-ethanol, ice, and the like.

Filling of Liquid Material in Pores Present in Electrode and Volume Expansion of the Liquid Material The Foregoing Eighth and Ninth Steps; See FIG. 1

As previously described, for the electrode component (the anode or cathode) comprising at least the active material layer and the collector (the active material layer being formed on the collector), in order to efficiently separate the active material layer from the collector, the pores present in the electrode component are filled with a specific liquid material having a property of causing volume expansion when solidified, followed by rapidly cooling the electrode to solidify the liquid material contained in the pores of the electrode component.

As preferable examples of such liquid material, there can be mentioned materials whose principal constituent comprises water.

It is desired for the liquid material to contain a surface active agent.

As previously described with reference to the apparatus shown in FIG. 3, to fill the liquid material (having a property of causing volume expansion when solidified) in the pores present in the electrode component to be recovered is desired to be conducted under reduced pressure.

Separately, the constituent components of the battery such as the battery housing, the electrode constituents including the active materials and collectors, the electrolyte, and the like which are recovered in the manner as above described can be effectively recycled for the production of a battery.

Battery whose Constituent Components are Recovered

Description will be made of a battery whose constituent components are recovered according to the present invention.

For the shape of a battery whose constituent components are recovered according to the present invention, it may be in the form of a flat round shape (or a coin-like shape), a cylindrical shape, a prismatic shape, or a sheet-like shape.

For the battery structure, it includes a single-layered type, a multi-layered type and a spiral-wound type.

In the case of a spiral-wound cylindrical battery comprising a stacked body (comprising a separator interposed between an anode and a cathode) wound in multiple about a given axis, it has advantages such that the battery area can be increased as desired and a high electric current can be flown upon operating charging and discharging.

In the case of a battery in either a prismatic form or sheet-like form, it has an advantage such that the space of an instrument for housing the battery can be effectively utilized.

In the following, description in more detail will be made of the shape and structure of such a battery with reference to FIGS. 5, 6 and 7.

FIG. 5 is a schematic cross-sectional view illustrating an example of a single-layer structure type flat battery. FIG. 6 is a schematic cross-sectional view illustrating an example of a spiral-wound cylindrical battery. FIG. 7 is a schematic perspective view illustrating an example of a prismatic battery. These batteries basically have a constitution similar to that shown in FIG. 4, and they comprise a anode, a cathode, a separator including an electrolyte, a battery housing and a pair of terminals.

In FIG. 5, reference numeral 301 indicates an anode comprising an anode active material layer, reference numeral 303 a cathode comprising a cathode active material, reference numeral 305 an anode cap (or an anode terminal), reference numeral 306 a cathode can (or a cathode terminal), reference numeral 307 a separator with an electrolyte (or an electrolyte solution) retained therein, and reference numeral 310 a gasket (or an insulating packing).

Figure 6:
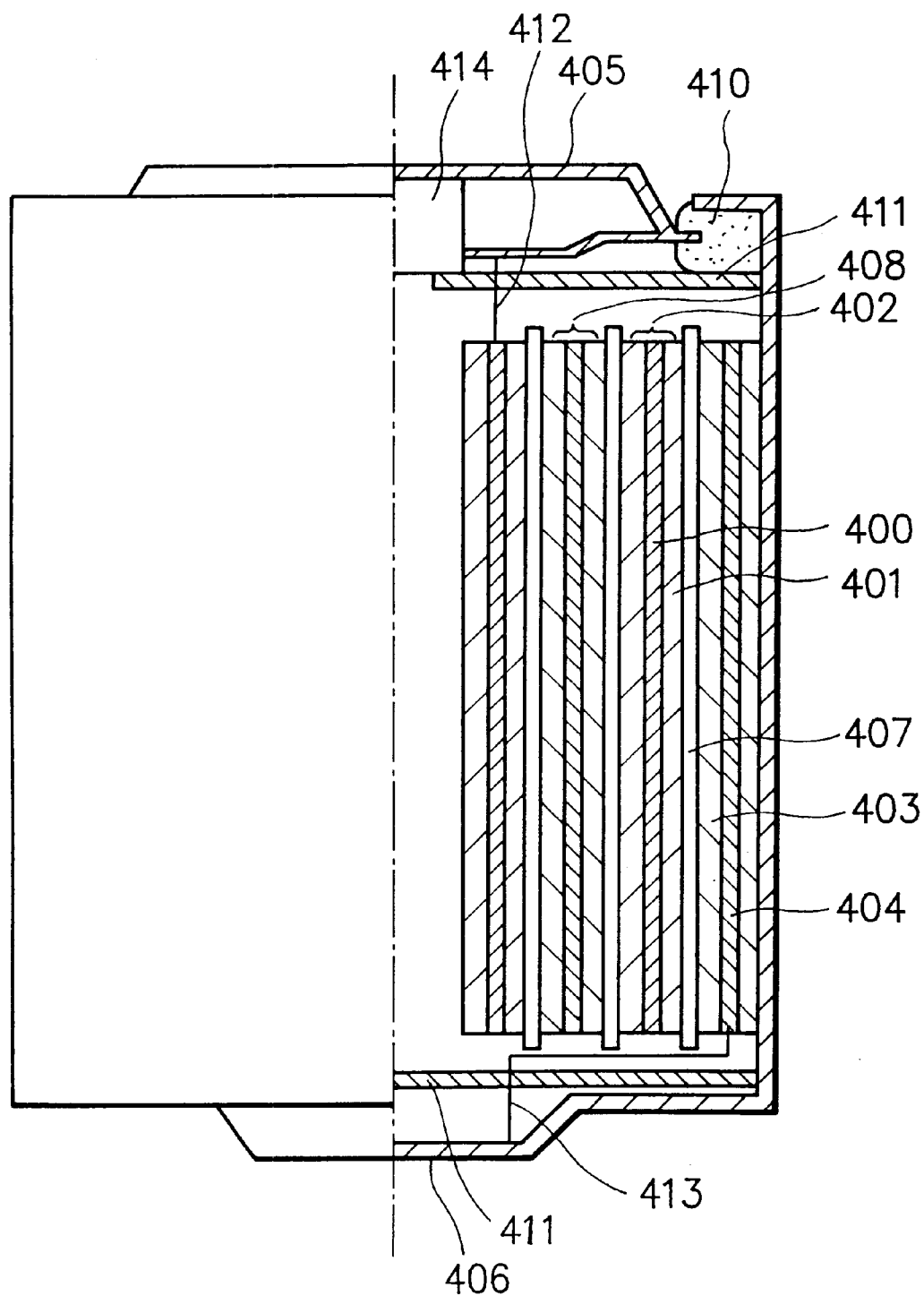
FIG. 6 is a schematic view illustrating an example of a spiral-wound cylindrical battery.

In FIG. 6, reference numeral 400 indicates an anode collector, reference numeral 401 an anode active material layer, reference numeral 402 an anode, reference numerals 403 a cathode active material, reference numeral 404 a cathode collector, reference numeral 405 an anode cap (or an anode terminal), reference numeral 406 a cathode can (or a cathode terminal), reference numeral 407 a separator with an electrolyte (or an electrolyte solution) retained therein, reference numeral 408 a cathode, reference numeral 410 a gasket (or an insulating packing), reference numeral 411 an insulating plate, reference numeral 412 an anode lead, reference numeral 413 a cathode lead, and reference numeral 414 a safety vent.

Particularly, in the single-layer structure type flat battery (the so-called coin-like shaped battery) shown in FIG. 5, an assembly comprising the cathode 303 (comprising the cathode active material) and the anode 301 (comprising the anode active material layer) stacked in this order from the cathode side through at least the separator 307 having an electrolyte solution retained therein is housed in the cathode can 306. The anode side of the assembly in the cathode can 306 is sealed by the anode cap 305 as the anode terminal and the residual inside space of the cathode can 306 is packed by the gasket 410 (comprising an insulating material).

In the spiral-wound cylindrical battery shown in FIG. 6, an assembly wound in multiple about a given axis is housed in the cathode can 406 as the cathode terminal such that the side face and a given bottom face side of the assembly are covered by the cathode can 406, said assembly comprising at least the separator 407 having an electrolyte solution retained therein interposed between the cathode 408 containing the cathode active material layer 403 formed on the cathode collector 404 and the anode 402 containing the anode active material layer 401 formed on the anode collector 400. In the uncovered side of the cathode can 406, the anode cap 405 as the anode terminal is installed. The residual inside space of the cathode can 406 is packed by the gasket 410 (comprising an insulating material). The stacked electrode assembly having the cylindrical structure is electrically isolated from the anode cap side through the insulating plate 411. The anode 402 is electrically connected to the anode cap 405 by means of the anode lead 412. Similarly, the cathode 408 is electrically connected to the cathode can 406 by means of the cathode lead 413. On the anode cap side, there is provided the safety vent 414 for adjusting the internal pressure of the battery.

Figure 7:
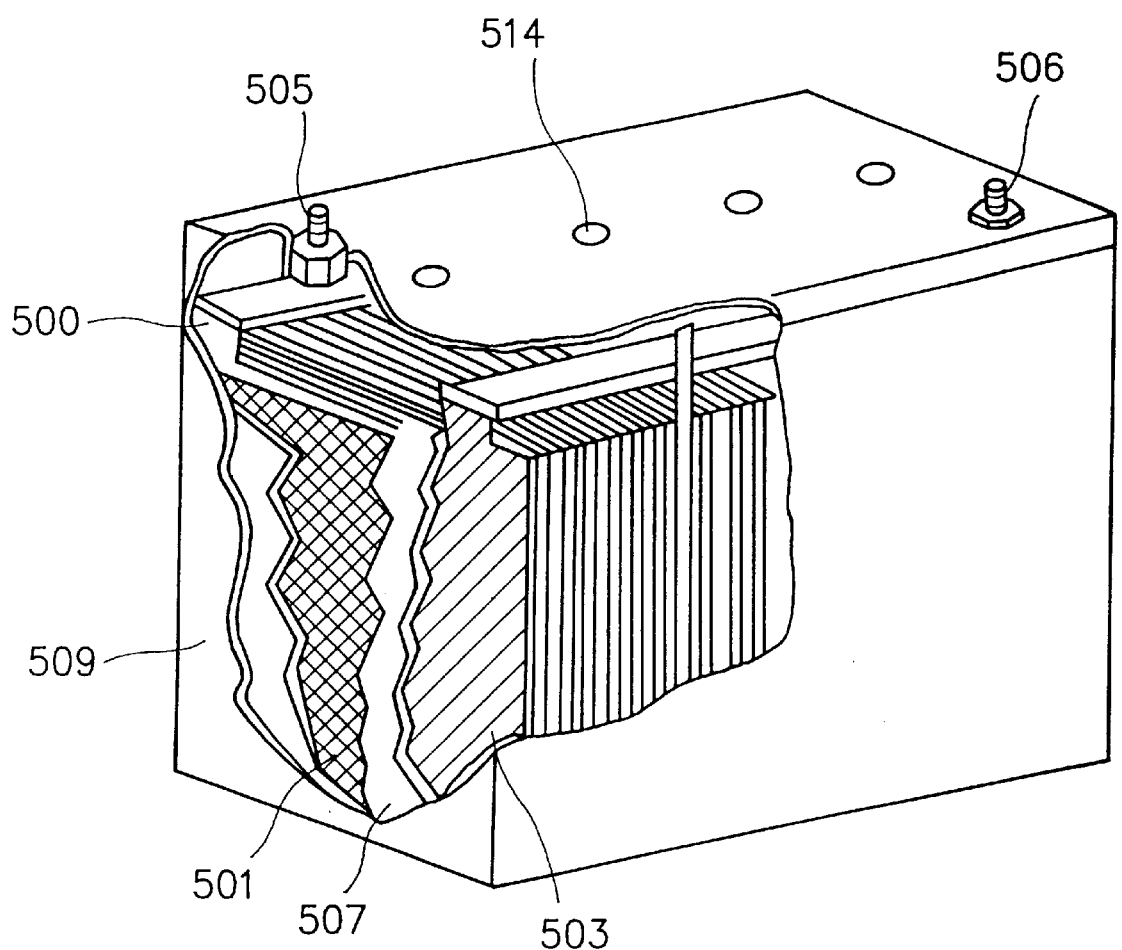
FIG. 7 is a schematic perspective view illustrating an example of a prismatic battery.

The prismatic battery shown in FIG. 7 comprises a plurality of unit cells integrated in parallel connection through a collector in a battery housing 509 having a capping, wherein each unit cell comprises a separator 507 having an electrolyte solution retained therein interposed between an anode 501 comprising an anode active material and a cathode 503 comprising a cathode active material. The anode 501 is electrically connected to an anode terminal 505, and the cathode 503 is electrically connected to a cathode terminal 506. The prismatic battery is provided with a plurality of safety vents 514 at the capping of the battery housing 509.

A battery having the configuration shown in FIG. 5 or FIG. 6 may be fabricated, for example, in the following manner.

A combination comprising the separator (307, 407) interposed between the anode active material layer (301, 401) and the cathode active material layer (303, 403) is positioned in the cathode can (306, 406). Thereafter, the electrolyte is introduced thereinto. The resultant is assembled with the anode cap (305, 405) and the gasket (310, 410), followed by subjecting to caulking treatment. Thus, there is obtained a battery having the configuration shown in FIG. 5 or FIG. 6.

The preparation of the constituent materials used for a lithium battery is desired to be conducted in a dry air atmosphere free of moisture or a dry inert gas atmosphere free of moisture in order to prevent the occurrence of chemical reaction of lithium with water and also in order to prevent the rechargeable lithium battery from being deteriorated due to chemical reaction of lithium with water in the inside of the battery.

A prismatic battery having the configuration shown in FIG. 7 may be fabricated, for example, in the following manner.

A plurality of unit cells each comprising the separator 507 sandwiched between the anode 501 and the cathode 503 are integrated in parallel connection through the collector 500 into an assembled body. The assembled body is positioned in the battery housing 509. Thereafter, an electrolyte solution is injected into in the battery housing 509. Then, the collector 502 is electrically connected to the anode terminal 506 and also to the cathode terminal 507. Finally, the capping is put to the battery hosing 509 to seal the inside of the battery housing. By this, there is obtained a prismatic battery having the configuration shown in FIG. 7.

In the following, description will be made of the constituents of the above-described batteries whose constituent components are recovered according to the present invention.

Battery Housing

In the case where the battery whose constituent components are recovered according to the present invention is of such configuration as shown in FIG. 5 or 6, the cathode can (306, 406) and the anode cap (305, 405) function respectively also as a battery housing. Therefore, they are desired to be constituted by a stainless steel such as titanium clad stainless steel, copper clad stainless steel, nickel-plated steel, or the like.

As in the case of the battery whose constituent components are recovered according to the present invention is of such configuration as shown in FIG. 7 wherein the battery housing does not function as the cathode or the anode cap, the constituent of the battery housing (509) can include, in addition to those stainless steels above mentioned, metals such as zinc, plastics such as polypropylene, and composites of a metal or glass fiber with plastic.

Safety Vent

The batteries whose constituent components are recovered according to the present invention are desired to be provided with an appropriate safety vent as in the case of the configuration shown in FIG. 6 (wherein the safety vent 414 is provided) or the configuration shown in FIG. 7 (wherein the safety vent 514 is provided) in order to ensure the safety when the internal pressure of the battery is incidentally increased, by communicating the inside of the battery with the outside to thereby reduce the increased internal pressure of the battery.

The safety vent may be constituted by a material comprising a rubber, a spring, a metal boll or a rupture foil.

Gasket

As the constituent of the gasket (310, 410), there can be used, for example, polyolefin resins, fluororesins, polyamide resins, polysulfone resins, or various rubbers.

The battery sealing is typically conducted by way of caulking with the use of the gasket in the case of the configuration as shown in FIG. 5 or 6. Besides this, it may be conducted by means of glass sealing, adhesive sealing, welding or soldering.

Separately, as the constituent of the insulating plate 411 shown in FIG. 6, there can be used organic resins and ceramics.

Anode

As representative examples of the battery whose constituent components are recovered according to the present invention, there can be mentioned nickel-metal hydride batteries and rechargeable lithium batteries including lithium ion batteries, which are high performance storage batteries.

The anode in such nickel-metal hydride battery comprises an anode active material layer comprising a powdery misch metal series or transition metal series hydrogen-absorbing alloy which is formed on an anode collector by way of sintering or with the use of a binder. The binder herein can include polyvinyl chloride, carboxymethyl cellulose, and the like.

The anode in such lithium battery comprises a principal constituent which retains lithium therein at a stage before operating discharging, and at least an anode collector.

Specific examples of such principal constituent are lithium metals, carbonous materials in which lithium is intercalated, transition metal oxides, transition metal sulfides, and lithium alloys.

The anode active material layer comprising such carbonous material or the like which intercalates lithium is usually formed by fixing the carbonous material or the like onto the anode collector with the use of a binder.

The anode collector serves to supply an electric current so that it can be efficiently consumed for the electrode reaction upon operating charging and discharging or to collect an electric current generated.

Therefore, it is desired for the anode collector to be constituted by an appropriate material which is highly electrically conductive and inactive to the battery reaction.

Specific examples of such material are metals such as Ni, Ti, Cu, Al, Pt, Pd, Au, and Zn, alloys of these metals such as stainless steel, and composite metals of tow or more said metals.

The anode collector may be shaped in a plate-like form, foil-like form, mesh form, porous form-like sponge, fibrous form, punching metal form, or expanded metal form.

Cathode

As previously described, the battery whose constituent components are recovered according to the present invention includes nickel-metal hydride batteries and rechargeable lithium batteries including lithium ion batteries, as representative examples.

The cathode in such lithium battery as above mentioned generally comprises a cathode collector, a cathode active material, an electrically conductive auxiliary, and a binder.

The cathode herein is usually formed by disposing a mixture of a cathode active material, an electrically conductive auxiliary and a binder on a member capable of serving as a cathode collector.

The electrically conductive auxiliary can include graphite, carbon blacks such as ketjen black and acetylene black, and metal fine powders of nickel or the like.

As the binder, there can be illustrated polyolefines such as polyethylene, polypropylene, and the like; and fluororesins such as polyvinylidene fluoride, tetrafluoroethylene polymer, and the like.

As the cathode active material in such lithium battery as above mentioned, there is usually used a compound selected from transition metal oxides, transition metal sulfides, lithium-transition metal oxides, and lithium-transition metal sulfides. The metals of these transition metal oxides and transition metal sulfides can include metals partially having a d-shell or f-shell.

Specific examples of such metal are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag and Au. Of these, Ti, V, Cr, Mn, Fe, Co, Ni and Cu are particularly appropriate.

For the cathode in such nickel-metal hydride battery as above mentioned, it is usually formed by filling a given porous collector with nickel hydroxide. As such porous collector, a sintered body of nickel fine powder or a foamed-like shaped nickel member is usually used.

The cathode collector serves to supply an electric current so that it can be efficiently consumed for the electrode reaction upon conducting the charging and discharging or to collect an electric current generated.

The cathode collector is therefore desired to be constituted by a material which is highly electrically conductive and is inactive to the battery reaction.

The material by which the cathode collector is constituted can include metals such as Ni, Ti, Al, Pt, Pb, Au, and Zn; alloys of these metals such as stainless steel; and composite metals of two or more of said metals.

The cathode collector may be shaped in a plate-like form, foil-like form, mesh form, porous form-like sponge, fibrous form, punching metal form, or expanded metal form.

Separator

The separator in the battery whose constituent components are recovered according to the present invention is interposed between the anode and the cathode, and it serves to prevent the anode and the cathode from suffering from internal-shorts. In addition, the separator also serves to retain the electrolyte solution.

The separator is required to have a porous structure capable of allowing ions of lithium, hydrogen, or the like involved in the charge and discharge reaction in the battery to pass therethrough, and it is also required to be insoluble into and stable to the electrolyte solution.

The separator is usually constituted by a nonwoven fabric or a membrane having a micropore structure made of glass, polyolefin such as polypropylene or polyethylene, fluororesin, or polyamide. Alternatively, the separator may be constituted by a metal oxide film or a resin film combined with a metal oxide respectively having a number of micropores.

Electrolyte

For the electrolyte used in the battery whose constituent components are recovered according to the present invention, there can be used an appropriate electrolyte as it is, a solution of said electrolyte dissolved in a solvent, or a material of said solution having solidified using a gelling agent.

However, an electrolyte solution obtained by dissolving an appropriate electrolyte in an solvent is usually used in such a way that said electrolyte solution is retained on the separator.

The higher the electrical conductivity of the electrolyte, the better. Particularly, it is desired to use such an electrolyte that the electrical conductivity at 25° C. is preferably $1 \times 10^{-3}$ S/cm or more or more preferably, $5 \times 10^{-3}$ S/cm or more.

As the electrolyte in the case of a lithium battery, there is usually used a given electrolyte dissolved in a given solvent.

The electrolyte can include inorganic acids such as $H_2SO_4$, HCl and $HNO_3$; salts of $Li^+$ (lithium ion) with Lewis acid ion such as $BF_4^-$, $PF_6^-$, $ClO_4^-$, $CF_3SO_3^-$, or $BPh_4^-$, (with Ph being a phenyl group); and mixtures of two or more of said salts. Besides these, salts of the above described Lewis acids ions with cations such as sodium ion, potassium ion, tetraalkylammonium ion, or the like are also usable.

In any case, it is desired that the above salts are used after they are subjected to dehydration or deoxygenation, for example, by way of heat treatment under reduced pressure.

The solvent in which the electrolyte is dissolved can include acetonitrile, benzonitrile, propylene carbonate, ethylene carbonate, dimethyl carbonate, diethyl carbonate, dimethylformamide, tetrahydrofuran, nitrobenzene, dichloroethane, diethoxyethane, 1,2-dimethoxyethane, chlorobenzene, γ-butyrolactone, dioxolan, sulfolan, nitrometane, dimethyl sulfide, dimethyl sulfoxide, methyl formate, 3-methyl-2-oxdazolydinone, 2-methyltetrahydrofuran, 3-propylsydonone, sulfur dioxide, phosphonyl chloride, thionyl chloride, sulfuly chloride, and mixtures of two or more of these.

As for these solvents, it is desired for them to be subjected to dehydration using activated alumina, molecular sieve, phosphorous pentaoxide, or calcium chloride, prior to their use. Alternatively, it is possible for them to be subjected to distillation in an atmosphere composed of inert gas in the presence of an alkali metal, wherein moisture and foreign matters are removed.

In order to prevent leakage of the electrolyte solution, it is desired for the electrolyte solution to be gelated using an appropriate gelling agent.

The gelling agent usable in this case can include polymers having a property such that it absorbs the solvent of the electrolyte solution to swell. Specific examples of such polymer are polyethylene oxide, polyvinyl alcohol, and polyacrylamide.

As the electrolyte in the case of a nickel-metal hydride battery, there is used an electrolyte comprising a given alkali dissolved in water as a solvent. Such alkali can include potassium hydroxide, sodium hydroxide, and lithium hydroxide. In this case, in order to prevent leakage of the electrolyte solution, it is desired for the electrolyte solution to be gelated using an appropriate gelling agent.

The gelling agent usable in this case can include polymers having a property such that it absorbs the solvent of the electrolyte solution to swell. Specific examples of such polymer are polyethylene oxide, polyvinyl alcohol, and polyacrylamide. Besides, starch is also usable.

In the following, the present invention will be described in more detail with reference to examples, which are only for illustrative purposes but not intended to restrict the scope of the present invention to these examples.

EXAMPLE 1

In this example, for a cylindrical rechargeable lithium battery having the configuration shown in FIG. 6, based on the flow diagram shown in FIG. 1, the battery housing thereof was opened, followed by subjecting to washing, the resultant was dissociated into individual battery components, and these battery components were separately recovered, wherein the separation of the active material layer for each electrode was conducted using the apparatus shown in FIG. 3.

I. As the above battery, there was used a used cylindrical rechargeable lithium battery. This cylindrical rechargeable lithium battery is one prepared by winding an assembled body [comprising a separator/a cathode (comprising a cathode active material layer and a cathode collector)/a separator/an anode (comprising an anode active material layer) stacked in this order] in multiple about a given axis, inserting the resultant in a cathode can, welding a cathode lead extending from the cathode collector to the cathode can, welding an anode lead extending from the anode collector to an anode cap, injecting an electrolyte solution into the cathode can, capping the anode cap to the cathode can, followed by sealing by way of caulking, wherein the anode comprises an anode obtained by fixing a powdery graphite (as an anode active material) on opposite surfaces of a copper foil (as an anode collector) with the use of a binder comprising polyvinylidene fluoride; the cathode comprises a cathode obtained by fixing a mixture comprising lithium-cobalt oxide (as a cathode active material) and acetylene black (as an electrically conductive auxiliary) on opposite surfaces of an aluminum foil (as a cathode collector) with use of a binder comprising polyvinylidene fluoride; the separator comprises a polyethylene member having a number of micropores; and the electrolyte solution comprises an electrolyte solution obtained by dissolving lithium hexafluorophosphate ($LiPF_6$) in an amount of 1M (mol/l) in a mixed solvent composed of ethylene carbonate (EC) and diethyl carbonate (DEC) with an equivalent mixing ratio.

II. In the following, the step of opening the battery, the steps of taking out and washing the electrodes, and the step of separating the active materials from the collectors by way of rapid cooling will be sequentially explained with reference to FIGS. 1 and 3.

As the cooling means, there was used liquid nitrogen.

1. First, in order to ensure the safety upon opening the battery housing and in order to ensure the recovery of the active materials in a desirable state, a capacitor was electrically connected to the cylindrical rechargeable lithium battery, followed by subjecting the battery to discharging, whereby the residual electric capacity in the battery was transferred into the capacitor.

2. A high pressure water (containing a powdery abrasive) of 3500 $Kg/cm^2$ was sprayed onto the cylindrical rechargeable lithium battery discharged in the above step 1 to cut the anode cap of the battery, whereby the battery housing was opened (the second step in FIG. 1).

3. From the cathode can of the battery, the assembled body comprising the anode component, the cathode component, and the separator (incorporated with the electrolyte solution) was taken out (the third step in FIG. 1), followed by washing with methanol, where the electrolyte solution was recovered from the resultant methanol solution. Then, the assembled body was again washed with water, followed by subjecting to further washing with methanol (the fourth step in FIG. 1).

4. The assembled body washed in the above step 3 was dissociated into the anode component, the cathode component, and the separator (the fifth step in FIG. 1). Herein, The separator was recovered.

5. Each of the anode and cathode components were treated using the apparatus shown in FIG. 3 as will be described below.

Treatment of the Anode Component

The anode component was positioned in the accommodation vessel 107 of the apparatus shown in FIG. 3. By actuating the vacuum pump of the exhaustion means 108 and opening the exhaust valves 116 and 117' and the vessel valve 115 while closing the liquid transporting valves 119 and 120 and the gas inducing valve 118, the inside of the accommodation vessel 107 was evacuated through the exhaust pipes 117 and 112. After this, the exhaust valves 116 and 117' and the vessel valve 115 was closed. Then, by opening the liquid transporting valves 119 and 120, a 10 wt. % methanol aqueous solution contained in the liquid reservoir 111 was introduced into the accommodation vessel 107 through the liquid transporting pipe 113, where the methanol aqueous solution introduced into the accommodation vessel 107 was invaded into the pores present in the opposite anode active material layers of the anode such that the pores were filled with the methanol aqueous solution (the eighth step in FIG. 1). Successively, by opening the gas transporting valve 118 and the vessel valve 115, a compressed air was introduced into the accommodation vessel 107 through the gas transporting pipe 114, where the methanol aqueous solution remained in the accommodation vessel 107 was returned into the liquid reservoir 111 by virtue of the action of the compressed air.

Thereafter, the gas inducing valve 118 and the vessel valve 115 were closed. Then, the anode whose pores being filled with the methanol aqueous solution was taken out from the apparatus.

The anode was immersed in liquid nitrogen contained in a Dewar flask to quickly cool the anode from 15° C. to −196° C. at a cooling rate (a temperature reduction rate) of 10° C./sec., whereby the methanol aqueous solution (specifically, the water) contained in the pores of the anode active material layers of the anode was frozen, whereby the pores of the anode active material layers were expanded to have cracks, wherein the binder contained in the anode active material layers was converted into a glassy state. Then, impact by means of a hammer was applied to the anode thus treated, whereby the anode active material layers were sufficiently separated from the anode collector (the ninth step in FIG. 1). From the resultants, there were separately recovered the copper foil as the anode collector, the graphite as the anode active material, and the binder (the tenth step in FIG. 1).

Treatment of the Cathode Component

The cathode component was treated in accordance with the above procedures for the treatment of the anode component, whereby the aluminum foil as the cathode collector, the lithium-cobalt oxide as the cathode active material, the acetylene black as the electrically conductive auxiliary, and the binder were separately recovered.

EXAMPLE 2

In this example, for a cylindrical primary lithium battery having the configuration shown in FIG. 6, based on the flow diagram shown in FIG. 1, the battery housing thereof was opened, followed by subjecting to washing, the resultant was dissociated into individual battery components, and these battery components were separately recovered.

I. As the above battery, there was used a used cylindrical primary lithium battery. This cylindrical primary lithium battery is one prepared by winding an assembly [comprising a separator/a cathode (comprising a cathode active material layer and a cathode collector)/a separator/an anode (comprising an anode active material layer) stacked in this order] in multiple about a given axis, inserting the resultant in a cathode can, welding a cathode lead extending from the cathode collector to the cathode can, welding an anode lead extending from the anode collector to an anode cap, injecting an electrolyte solution into the cathode can, capping the anode cap to the cathode can, followed by sealing by way of caulking, wherein the anode comprises an anode obtained by press-laminating a lithium metal foil (as an anode active material layer) on opposite surfaces of an expanded metal of nickel (as an anode collector); the cathode comprises a cathode obtained by applying a paste as a cathode active material layer (obtained by mixing manganese dioxide (as a cathode active material), acetylene black (as an electrically conductive auxiliary) and polyvinylidene fluoride (as a binder) to obtain a mixture and adding N-methlypyrrolidone to the mixture) on opposite surfaces of a nickel mesh member as a cathode collector and drying the resultant; the separator comprises a polyethylene member having a number of micropores; and the electrolyte solution comprises an electrolyte solution obtained by dissolving lithium tetrafluoroborate in an amount of 1M (mol/l) in a solvent comprising propylene carbonate.

II. In the following, the step of opening the battery, the steps of taking out and washing the electrodes, and the step of separating the active materials from the collectors by way of rapid cooling will be sequentially explained with reference to FIG. 1.

As the cooling means, there was used liquid nitrogen.

1. First, in order to ensure the safety upon opening the battery housing and in order to ensure the recovery of the active materials in a desirable state, a capacitor was electrically connected to the cylindrical primary lithium battery, followed by subjecting the battery to discharging, whereby the residual electric capacity in the battery was transferred into the capacitor.

2. The anode cap of the cylindrical primary lithium battery discharged in the above step 1 was cut by rotating a disc-like shaped blade having a hard and sharp edge at a high speed while contacting the blade to the anode cap, whereby the battery housing was opened (the second step in FIG. 1).

3. From the cathode can of the battery, the assembled body comprising the anode component, the cathode component, and the separator (incorporated with the electrolyte solution) was taken out (the third step in FIG. 1), followed by washing with acetone (the fourth step in FIG. 1), where the electrolyte solution was recovered from the resultant acetone solution. The assembled body thus washed was dissociated into the anode component, the cathode component, and the separator (the fifth step in FIG. 1). The cathode component and the separator were washed with water, followed by further washing with methanol (the fifth step in FIG. 1).

Herein, the separator was recovered. For the anode component and cathode component, they were subjected to further treatment as will be described below.

4. The anode component was gradually reacted with cold water of less than 10° C. in an atmosphere composed of Ar gas to convert the metal lithium (as the anode active material layer) still remained on the opposite surfaces of the expanded metal of nickel as the anode collector into lithium hydroxide, the expanded metal of nickel as the anode collector, and the above lithium hydroxide were separately recovered.

In the above, hydrogen gas generated upon the reaction of the metal lithium with the water was removed using an eliminator with the use of Pd, where the Ar gas and hydrogen gas were recovered.

5. The cathode component was immersed in pure water added with a nonionic surface active agent contained in a treatment equipment, where the cathode component was subjected to ultrasonic vibration treatment using an ultrasonic washer capable of generating an ultrasonic wave of 37,000 to 47,000 Hz, whereby the pure water added with the nonionic surface active agent (hereinafter referred to as "nonionic surface active agent-containing water") was invaded into the pores present in the cathode active material layers on the cathode collector such that the pores were sufficiently filled with the nonionic surface active agent-containing water, and separation with a certain extent was occurred at the interface between each of the cathode active material layers and the cathode collector. (the seventh step in FIG. 1)

Then, the cathode component (in which the cathode active material layers still remains while somewhat contacting with the cathode collector) was immersed in liquid nitrogen contained in a Dewar flask, where the cathode component was rapidly cooled from 15° C. to −196° C. at a cooling rate (a temperature reduction rate) of ° C./sec. Then, impact by means of a hammer was applied to the cathode component thus treated, whereby the cathode active material layers were sufficiently separated from the cathode collector (the eighth and ninth steps in FIG. 1).

From the resultants, there were separately recovered the nickel mesh member as the cathode collector, the manganese dioxide (in which lithium is intercalated) as the cathode active material, the electrically conductive auxiliary, and the binder (the tenth step in FIG. 1).

EXAMPLE 3

In this example, for a cylindrical rechargeable nickel-metal hydride battery having the configuration shown in FIG. 6, based on the flow diagram shown in FIG. 1, the battery housing thereof was opened, followed by subjecting to washing, the resultant was dissociated into individual battery components, and these battery components were separately recovered, wherein the separation of the active material layer for each electrode was conducted using the apparatus shown in FIG. 3.

I. As the above battery, there was used a used cylindrical rechargeable nickel-metal hydride battery. This cylindrical rechargeable nickel-metal hydride battery is one prepared by winding an assembled body [comprising a separator/a cathode (comprising a cathode active material layer and a cathode collector)/a separator/an anode (comprising an anode active material layer) stacked in this order] in multiple about a given axis, inserting the resultant in a cathode can, welding a cathode lead extending from the cathode collector to the cathode can, welding an anode lead extending from the anode collector to an anode cap, injecting an electrolyte solution into the cathode can, capping the anode cap to the cathode can, followed by sealing by way of caulking, wherein the anode comprises an anode obtained by press-coating a fine-powdery material of a transition metal alloy series hydrogen-absorbing alloy (as an anode active material) on opposite surfaces of a nickel mesh member (as an anode collector) and subjecting the resultant to sintering; the cathode comprises a cathode obtained by subjecting a porous nickel sintered body (as a cathode collector) impregnated with nickel nitrite (as a cathode active material) to chemical conversion treatment; the separator comprises a nonwoven fabric polypropylene member which is applied with hydrophilic treatment; and the electrolyte solution comprises a potassium hydroxide aqueous solution added with lithium hydroxide.

II. In the following, the step of opening the battery, the steps of taking out and washing the electrodes, and the step of separating the active materials from the collectors by way of rapid cooling will be sequentially explained with reference to FIGS. 1 and 3.

As the cooling means, there was used liquid nitrogen.

1. First, in order to ensure the safety upon opening the battery housing and in order to ensure the recovery of the active materials in a desirable state, a capacitor was electrically connected to the cylindrical rechargeable nickel-metal hydride battery, followed by subjecting the battery to discharging, whereby the residual electric capacity in the battery was transferred into the capacitor.

2. The battery discharged in the above step 1 was subjected to cutting treatment with the use of $CO_2$-laser beam while spraying nitrogen gas to the battery to cut the anode cap of the battery, whereby the battery housing was opened (the second step in FIG. 1).

3. From the cathode can of the battery, the assembled body comprising the anode component, the cathode component, and the separator (incorporated with the electrolyte solution) was taken out (the third step in FIG. 1), followed by washing with water, where the electrolyte solution was recovered from the resultant aqueous solution (the fourth step in FIG. 1). The assembled body thus washed was dissociated into the anode component, the cathode component, and the separator (the fifth step in FIG. 1).

Herein, the separator was recovered. For the anode component and cathode component, they were subjected to further treatment as will be described below.

4. The anode component was quickly heated to 150° C., followed by immersing in nitrogen liquid contained in a Dewar flask, where the anode component was rapidly cooled from 150° C. to −196° C. at a cooling rate (a temperature reduction rate) of 17° C./sec. This procedures were repeated three times (the sixth step in FIG. 1). The temperature of the anode component thus treated was returned to room temperature.

5. The anode component treated in the above step 4 was positioned in the accommodation vessel 107 of the apparatus shown in FIG. 3. By actuating the vacuum pump of the exhaustion means 108 and opening the exhaust valves 116 and 117' and the vessel valve 115 while closing the liquid transporting valves 119 and 120 and the gas inducing valve 118, the inside of the accommodation vessel 107 was evacuated through the exhaust pipes 117 and 112. After this, the exhaust valves 116 and 117' and the vessel valve 115 was closed. Then, by opening the liquid transporting valves 119 and 120, pure water contained in the liquid reservoir 111 was introduced into the accommodation vessel 107 through the liquid transporting pipe 113, where the water introduced into the accommodation vessel 107 was invaded into the pores present in the opposite anode active material layers of the anode component such that the pores were sufficiently filled with the water (the eighth step in FIG. 1). Successively, by opening the gas transporting valve 118 and the vessel valve 115, a compressed air was introduced into the accommodation vessel 107 through the gas transporting pipe 114, where the water remained in the accommodation vessel 107 was returned into the liquid reservoir 111 by virtue of the action of the compressed air.

Thereafter, the gas inducing valve 118 and the vessel valve 115 were closed. Then, the anode component whose pores being filled with the water was taken out from the apparatus. The anode component was immersed in liquid nitrogen contained in a Dewar flask, where the anode component was rapidly cooled from 15° C. to −196° C. at a cooling rate (a temperature reduction rate) of 12° C./sec., whereby the water contained in the pores of the anode active material layers of the anode component was frozen to expand the pores of the anode active material layers such that they had cracks. Then, impact by means of a hammer was applied to the anode component, whereby the anode active material layers were sufficiently separated from the anode collector (the ninth step in FIG. 1). From the resultants, there were separately recovered the nickel mesh member as the anode collector and the transition metal alloy series hydrogen-absorbing alloy as the anode active material (the tenth step in FIG. 1).

6. For the cathode component, thermal shock was applied thereto in the same manner as in the above step 4 (the sixth step in FIG. 1). Then, the cathode component was treated in accordance with the above procedures in the above step 5, whereby pure water was invaded into the pores present in the opposite cathode active material layers of the cathode component such that the pores were sufficiently filled with the water (the eighth step in FIG. 1).

The cathode component thus treated was immersed in liquid nitrogen in a Dewar flask, where the cathode component was rapidly cooled from 15° C. to −196° C. at a cooling rate (a temperature reduction rate) of 12° C./sec., whereby the water contained in the pores of the cathode active material layers of the cathode component was frozen to expand the pores of the cathode active material layers, where the cathode active material layers were broken.

The cathode component was taken out from the Dewar flask, and vibration by means of a vibrator was applied to the cathode component, whereby the cathode active material layers were sufficiently separated from the cathode collector (the ninth step in FIG. 1).

From the resultants, there were separately recovered the nickel sintered member as the cathode collector and the nickel hydroxide as the cathode active material (the tenth step in FIG. 1).

EXAMPLE 4

In this example, for a cylindrical rechargeable nickel-metal hydride battery having the configuration shown in FIG. 6, based on the flow diagram shown in FIG. 1, the battery housing thereof was opened, followed by subjecting to washing, the resultant was dissociated into individual battery components, and these battery components were separately recovered, wherein the separation of the active material layer for each electrode was conducted using the apparatus shown in FIG. 3.

I. As the above battery, there was used a used cylindrical rechargeable nickel-metal hydride battery. This cylindrical rechargeable nickel-metal hydride battery is one prepared by winding an assembled body [comprising a separator/a cathode (comprising a cathode active material layer and a cathode collector)/a separator/an anode (comprising an anode active material layer) stacked in this order] in multiple about a given axis, inserting the resultant in a cathode can, welding a cathode lead extending from the cathode collector to the cathode can, welding an anode lead extending from the anode collector to an anode cap, injecting an electrolyte solution into the cathode can, capping the anode cap to the cathode can, followed by sealing by way of caulking, wherein the anode comprises an anode obtained by filling a foamed nickel member (as an anode collector) with a mixture composed of a fine-powdery material of a misch metal series hydrogen-absorbing alloy (as an anode active material), a powdery nickel material (as an electrically conductive auxiliary) and a mixture of polyvinyl chloride and carboxymethylcellulose (as a binder) and subjecting the resultant to press-molding; the cathode comprises a cathode obtained by subjecting a porous nickel sintered body (as a cathode collector) impregnated with nickel nitrate (as a cathode active material) to chemical conversion treatment; the separator comprises a polypropylene member having a number of micropores and which is applied with hydrophilic treatment; and the electrolyte solution comprises a potassium hydroxide aqueous solution added with lithium hydroxide.

II. In the following, the step of opening the battery, the steps of taking out and washing the electrodes, and the step of separating the active materials from the collectors by way of rapid cooling will be sequentially explained with reference to FIG. 1.

As the cooling means, there was used liquid nitrogen.

1. First, in order to ensure the safety upon opening the battery housing and in order to ensure the recovery of the active materials in a desirable state, a capacitor was electrically connected to the cylindrical rechargeable nickel-metal hydride battery, followed by subjecting the battery to discharging, whereby the residual electric capacity in the battery was transferred into the capacitor.

2. The anode cap of the cylindrical rechargeable nickel-metal hydride battery discharged in the above step 1 was cut by rotating a disc-like shaped blade having a hard and sharp edge at a high speed while contacting the blade to the anode cap, whereby the battery housing was opened (the second step in FIG. 1).

3. From the cathode can of the battery, the assembled body comprising the anode component, the cathode component, and the separator (incorporated with the electrolyte solution) was taken out (the third step in FIG. 1), followed by washing with water (the fourth step in FIG. 1), where the electrolyte solution was recovered from the resultant aqueous solution.

The assembled body thus washed was dissociated into the anode component, the cathode component, and the separator (the fifth step in FIG. 1). Herein, the separator thus washed was recovered. For the anode component and cathode component, they were subjected to further treatment as will be described below.

4. The anode component was immersed in a nitrogen liquid contained in a Dewar flask, where the anode component was rapidly cooled from room temperature (23° C.) to −196° C. at a cooling rate (a temperature reduction rate) of 12° C./sec., whereby thermal shock was applied to the anode component to cause cracks in the anode active material layers of the anode component (the sixth step in FIG. 1). The temperature of the anode component thus treated was returned to room temperature.

5. The anode component treated in the above step 4 was immersed in tetrahydrofuran contained in a treatment equipment to elute the polyvinyl chloride as the binder into the tetrahydrofuran, whereby the polyvinyl chloride was removed. Then, the anode component was immersed in water contained in a treatment equipment to elute the carboxymethylcellulose into the water whereby removing the carboxymethylcellulose, followed by drying. After this, vibration was applied to the anode component by means of a vibrator (the seventh step in FIG. 1), whereby the anode active material layers were sufficiently separated from the anode collector. From the resultants, there were separately recovered the nickel member as the anode collector and the misch metal series hydrogen-absorbing alloy as the anode active material (the tenth step in FIG. 1).

6. For the cathode component, thermal shock was applied thereto in the same manner as in the above step 4 (the sixth step in FIG. 1), followed by immersing in pure water contained in a treatment equipment to fill the pores present in the cathode active material layers of the cathode component with the water (the eighth step in FIG. 1). Thereafter, the cathode component was immersed in liquid nitrogen contained in a Dewar flask, where the cathode component was rapidly cooled from 15° C. to −196° C. at a cooling rate (a temperature reduction rate) of 12° C./sec., whereby the water contained in the pores of the cathode active material layers of the cathode component was frozen to expand the pores of the cathode active material layers, wherein the cathode active material layers were broken.

The temperature of the cathode component thus treated was returned to room temperature. After this, the cathode component was subjected to ultrasonic vibration treatment using an ultrasonic washer capable of generating an ultrasonic wave of 37,000 to 47,000 Hz, whereby the cathode active material layers were sufficiently separated from the cathode collector (the ninth step in FIG. 1).

From the resultants, there were separately recovered the nickel sintered body as the cathode collector and the nickel hydroxide as the cathode active material (the tenth step in FIG. 1).

EXAMPLE 5

The procedures of Example 3 were repeated, except that in the step 4 of Example 3, impact by means of a hammer was applied to the anode component after the cooling treatment. As a result, the separation of the anode active material layers from the collector was more facilitated than that in the case of Example 3.

In any of the foregoing examples 1 to 5 which were conducted while principally focusing on the recovery of the active materials and collectors, the recovery of the battery components could be readily and efficiently conducted.

Incidentally, in the foregoing examples 1 to 5, description has been made of the recovery of the battery components of the rechargeable lithium battery, primary lithium battery, and rechargeable nickel-metal hydride batteries. It should be understood that these examples are only for illustrative purposes and the present invention can be optionally employed in any other kinds of batteries having electrodes comprising an active material layer formed on a collector, in order to recover their battery components.

As apparent from the above description, the present invention has various significant advantages as will be described in the following. According to the present invention, for a given battery having electrodes comprising an active material layer formed on a collector, its constituent components can be efficiently separated and individually recovered without damaging them at a reasonable cost. Particularly, the recovery of the battery components, particularly the collectors and active materials, can be readily conducted, and such battery components recovered can be desirably and effectively recycled for the production of a battery.

What is claimed is:

1. A recovering process for recovering constituent components of a battery, said battery having a battery housing in which battery components including at least an electrode comprising at least an active material layer formed on a collector are assembled while being sealed by said battery housing, said process including the steps of:
   (i) opening said battery housing;
   (ii) taking out said battery components from said battery housing;
   (iii) sorting said battery components taken out in said step (ii) into individual components including said electrode; and
   (iv) applying thermal shock to the electrode sorted in said step (iii) by at least cooling the electrode, whereby separating the active material layer from the collector for the electrode.

2. A recovering process according to claim 1, wherein cooling the electrode is carried out once or several times.

3. A recovering process according to claim 1, wherein the step (iv) includes a step of heating the electrode.

4. A recovering process according to claim 3, wherein heating the electrode is carried out once or repeated several times.

5. A recovering process according to claim 1, wherein the step (iv) includes a step of applying an impact energy or vibration energy to the electrode to peel and separate the active material layer from the collector.

6. A recovering process according to claim 1, wherein the step (iv) comprises filling pores present in the electrode comprising the active material layer formed on the collector with a liquid material having a property of causing volume expansion when solidified, and cooling the electrode whose pores present therein being filled with said liquid material to solidify and volume-expand the liquid material contained in the pores present in the electrode, whereby separating the active material layer from the collector.

7. A recovering process according to claim 6, wherein the liquid material is a liquid material whose principal constituent is water.

8. A recovering process according to claim 6, wherein the liquid material contains a surface active agent.

9. A recovering process according to claim 6, wherein filling the pores present in the electrode with the liquid material is carried out under reduced pressure.

10. A recovering process according to claim 1, wherein the electrode contains a binder used therein, and the electrode is cooled to a lower temperature than the glass transition temperature of said binder.

11. A recovering process according to claim 1, wherein the active material layer contains a binder used therein.

12. A recovering process according to claim 11, wherein the electrode is cooled to a lower temperature than the glass transition temperature of said binder.

13. A recovering process according to claim 12, wherein after the active material layer is separated from the collector in the step (iv), the active material layer is cooled to a lower temperature than the glass transition temperature of the binder, and the active material layer is pulverized.

14. A recovering process according to claim 1, wherein cooling the electrode is carried out by immersing the electrode in liquid nitrogen.

15. A process for the production of a battery by using an active material and/or collector of a battery which are recovered according to a recovering process defined in claim 1.

* * * * *

UNITED STATES PATENT AND TRADEMARK OFFICE
CERTIFICATE OF CORRECTION

PATENT NO. : 5,972,531

DATED : October 26, 1999

INVENTOR(S): SOICHIRO KAWAKAMI

Page 1 of 2

It is certified that error appears in the above-identified patent and that said Letters Patent is hereby corrected as shown below:

Title page,

[57] ABSTRACT:

```
Line 3, "collector, said process" should read
   --collector-- and "at least" should be deleted.
Line 4, "said" should read --the--.
Line 5, "at least" should be deleted.
```

COLUMN 1:

```
Line 26, "a" should read --as--.
Line 37, "potable" should read --portable--.
```

COLUMN 2:

```
Line 7, "potable" should read --portable--.
Line 9, "potable" should read --portable--.
```

COLUMN 8:

```
Line 66, "To open" should read --Opening--, and
   "conducted" should read --be conducted by--.
Line 67, "by way of" should read --such as--.
```

UNITED STATES PATENT AND TRADEMARK OFFICE
CERTIFICATE OF CORRECTION

PATENT NO. : 5,972,531
DATED : October 26, 1999
INVENTOR(S): SOICHIRO KAWAKAMI

Page 2 of 2

It is certified that error appears in the above-identified patent and that said Letters Patent is hereby corrected as shown below:

COLUMN 12:

Line 65, "into in" should read --into--.

COLUMN 14:

Line 25, "tow" should read --two--.

Signed and Sealed this

Twenty-seventh Day of March, 2001

Attest:

NICHOLAS P. GODICI

Attesting Officer

Acting Director of the United States Patent and Trademark Office